(12) United States Patent
Folick et al.

(10) Patent No.: US 12,294,125 B2
(45) Date of Patent: May 6, 2025

(54) SYSTEMS AND METHODS FOR POWERING DOWN A GENERATOR INCLUDING A FUEL CELL

(71) Applicant: Toyota Motor Engineering & Manufacturing North America, Inc., Plano, TX (US)

(72) Inventors: Daniel Charles Folick, Long Beach, CA (US); Matthew K. McClory, Aliso Viejo, CA (US); Dakota Kelley, Garland, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 799 days.

(21) Appl. No.: 17/566,074

(22) Filed: Dec. 30, 2021

(65) Prior Publication Data

US 2023/0216073 A1    Jul. 6, 2023

(51) Int. Cl.
*H01M 8/04537* (2016.01)
*H01M 8/04303* (2016.01)
*H01M 8/0432* (2016.01)
*H01M 8/04664* (2016.01)

(52) U.S. Cl.
CPC ... *H01M 8/04619* (2013.01); *H01M 8/04303* (2016.02); *H01M 8/04365* (2013.01); *H01M 8/04626* (2013.01); *H01M 8/04686* (2013.01)

(58) Field of Classification Search
CPC ......... H01M 8/04303; H01M 8/04753; H01M 8/04932; H01M 8/0494; H01M 8/04947; H01M 8/04955
See application file for complete search history.

(56) References Cited

U.S. PATENT DOCUMENTS

| | | |
|---|---|---|
| 8,043,758 B2 | 10/2011 | Noetzel et al. |
| 10,147,960 B2 | 12/2018 | Lee et al. |
| 10,644,335 B2 | 5/2020 | Hasegawa |
| 2002/0076583 A1 | 6/2002 | Reiser et al. |

(Continued)

FOREIGN PATENT DOCUMENTS

| | | | |
|---|---|---|---|
| CN | 111082098 | * | 4/2020 |
| CN | 111082098 A | | 4/2020 |
| WO | WO 2017-104257 | * | 6/2017 |

OTHER PUBLICATIONS

English translation of WO Publication 2017-104257, Jun. 2017.*

(Continued)

*Primary Examiner* — Brittany L Raymond
(74) *Attorney, Agent, or Firm* — Christopher G. Darrow; DARROW MUSTAFA PC

(57) ABSTRACT

System, methods, and other embodiments described herein relate to safely ceasing fuel cell (FC) operation and idling components of a generator. In one embodiment, a method includes ceasing power generation by reducing fuel to an FC within a generator while maintaining energy to sensitive components by a battery. The method also includes idling a direct current (DC) converter and a load inverter associated with the power generation before idling the battery. The method also includes, upon successfully completing tests and powering down non-critical components of the generator, entering the generator into a standby status.

20 Claims, 4 Drawing Sheets

(56) References Cited

U.S. PATENT DOCUMENTS

2012/0326516 A1  12/2012  Gurunathan et al.

OTHER PUBLICATIONS

Ronald H. Wolk, "Fuel cells for homes and hospitals," in IEEE Spectrum, vol. 36, No. 5, pp. 45-52, May 1999.
Bozzolo et al., "Moving Towards Climate Neutrality—Fuel Cell Technology for Future Energy and Propulsion Systems," found at: https://www.mtu-solutions.com/au/en/technical-articles/2020/moving-towards-climate-neutrality-fuel-cell-technology-for-future-energy-and-propulsion-systems.html (dated Nov. 18, 2020; accessed on Dec. 29, 2021).

\* cited by examiner

SYSTEMS AND METHODS FOR POWERING DOWN A GENERATOR INCLUDING A FUEL CELL

TECHNICAL FIELD

The subject matter described herein relates, in general, to operating a power generator, and, more particularly, to idling components of the power generator safely for power down using a control sequence.

BACKGROUND

Systems use various energy resources to generate power. For example, a generator uses propane, natural gas, or kerosene as an energy resource to produce electricity. Such generators are used for supplying regular power or as standby in the event that the primary power is lost. These generators use a motor that energizes a dynamo to produce direct current (DC) or an alternator to produce alternating current (AC) and output electrical power. In either case, the durability and life of the motor, dynamo, or alternator diminish through mismanaged control. For instance, mechanical components wear out sooner when the control system under-delivers power to a load.

Similar to other resources, a generator can use a fuel cell (FC) to efficiently power an electrical load. An FC converts hydrogen fuel and oxygen to produce DC power. An inverter can convert the DC power to AC power for powering a load such as a commercial or residential building. Depending on system control, the water and excess heat generated by FCs reduce efficiency and increase the risk of damaging electrical components in the system. Furthermore, a control system mismanaging transitions of the FC can increase heat and energy imbalances on an electrical bus, thereby reducing the life of the electrical components.

SUMMARY

In one embodiment, example systems and methods relate to safely ceasing operation of a fuel cell (FC) used by a generator. In various implementations, generators encounter difficulties powering down components safely. This can increase wear and reduce lifespan. For example, a controller of an FC abruptly changing power levels can prematurely wear an electrical bus or subsystems. In certain circumstances, a component fails due to heat when a controller mismanages FC cooling during system idling. Therefore, in one embodiment, an idling system follows a control sequence to idle components of an FC enclosed within a generator before entering a standby status, thereby increasing system durability. In particular, the idling system ceases power generation for the FC by reducing fuel while maintaining power to components (e.g., a high-voltage bus or sensitive components) to prevent a pressure change suddenly. The FC also uses the maintained power for safety tasks before powering down completely. Next, the idling system idles the DC converter followed by the inverter before idling the battery, thereby avoiding power changes suddenly to the components.

Moreover, the idling system conducts tests and performs additional measures before entering the standby status after idling the DC converter, the inverter, and the battery. In one approach, the tests involve sensitive components such as the high-voltage bus of the FC. The tests also involve non-critical components such as the ignition system. Causing damage or regular faults to the electrical bus or the ignition system makes the FC inoperable over time. As such, the idling system then powers down non-critical components of the FC and enters the system into the standby status upon successfully completing the tests. In this way, the idling system safely idles sensitive components and powers down non-critical components using an optimal control sequence, thereby increasing system durability and avoiding damage to the FC and the generator.

In one embodiment, an idling system for safely ceasing operation of an FC used by a generator is disclosed. The idling system includes one or more processors and a memory communicably coupled to the one or more processors and storing a control module including instructions that, when executed by the one or more processors, cause the one or more processors to cease power generation by reducing fuel to an FC within a generator while maintaining energy to sensitive components by a battery. The instructions also include instructions to idle a DC converter and a load inverter associated with the power generation before idling the battery. The instructions also include instructions to enter, upon successfully completing tests and powering down non-critical components of the generator, the generator into a standby status.

In one embodiment, a non-transitory computer-readable medium for safely ceasing operation of an FC used by a generator and including instructions that when executed by a processor cause the processor to perform one or more functions is disclosed. The instructions include instructions to cease power generation by reducing fuel to an FC within a generator while maintaining energy to sensitive components by a battery. The instructions also include instructions to idle a DC converter and a load inverter associated with the power generation before idling the battery. The instructions also include instructions to enter, upon successfully completing tests and powering down non-critical components of the generator, the generator into a standby status.

In one embodiment, a method for safely ceasing operation of an FC used by a generator is disclosed. In one embodiment, the method includes ceasing power generation by reducing fuel to an FC within the generator while maintaining energy to sensitive components by a battery. The method also includes idling a DC converter and a load inverter associated with the power generation before idling the battery. The method also includes, upon successfully completing tests and powering down non-critical components of the generator, entering the generator into a standby status.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
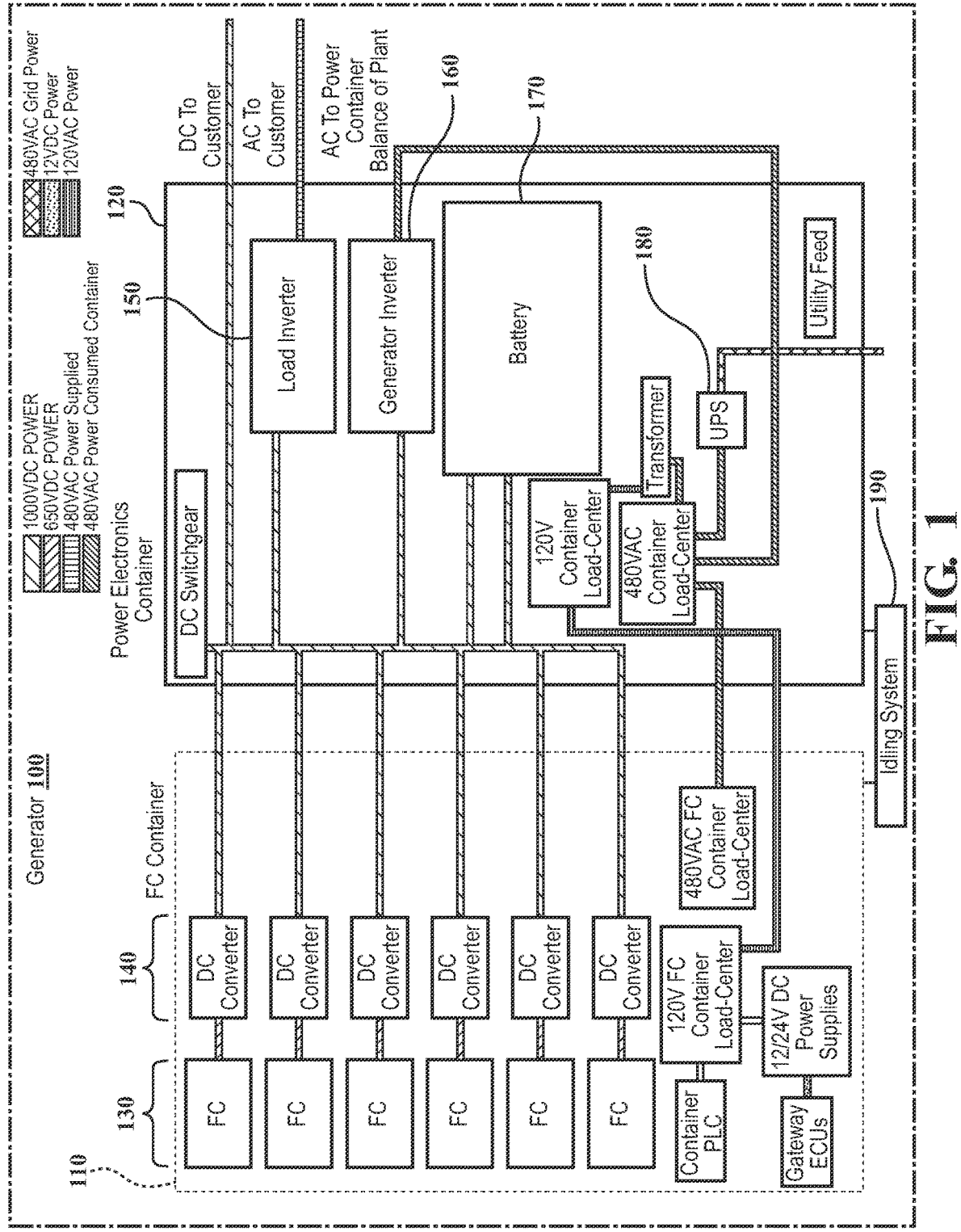
FIG. 1 illustrates one embodiment of a generator having fuel cells (FC) within which systems and methods disclosed herein may be implemented.

Systems, methods, and other embodiments associated with safely ceasing fuel cell (FC) operation and idling components of a generator are disclosed herein. In various implementations, generators using FCs encounter difficulties idling and powering down components safely. This can reduce the durability and lifespan of an FC. For example, a logic controller of an FC abruptly changing energy levels can prematurely wear an electrical bus and damage water pumps. Therefore, in one embodiment, an idling system follows a control sequence to power down FCs, idle direct current (DC) converters, and idle a load inverter in a generator safely. As such, FCs cease power generation while maintaining energy to sensitive components for performing safety tasks. In particular, the idling system gradually reduces FC energy by powering down electrical buses by using DC converters. Here, the DC converters efficiently provide a DC voltage consistently on multiple electrical buses from the varying DC power outputted by the FCs, thereby providing constant power to the load inverter. This regulated approach maintains energy since the FCs consume electricity and output excess energy until gradually and completely powering down. The idling system also preconditions the generator for future generation by clearing water from the FCs before completely powering down. In this way, the idling system prevents damage and reduces startup time for the FCs.

Furthermore, the idling system idles the DC converters and the load inverter before the battery of the generator. In one approach, idling may involve keeping a component in a low energy, a standby, or a complete powered down status. For example, a component can readily transition to an active or running status after idling. Here, the idling system reduces the electrical bus energy of the FCs to a low-voltage before completely idling the load inverter by using the battery. In this way, a target load still gradually receives power from the battery during a standby transition, thereby preventing a sudden drop in power. Also, the idling system gradually reduces energy to the electrical buses for the DC converters to prevent damage.

The idling system then completes tests and powers down non-critical components before entering the generator to a standby status. For example, the idling system checks for complete and successful power down of the FCs. A successful test may involve all of the FCs in a bank reporting appropriate energy levels, temperatures, and water levels. The FCs or the generator enter a fault status if a test is unsuccessful. Otherwise, the transition to the standby status is completed.

In one approach, the fault status involves the idling system commanding a gateway of the FC to power down, closing fuel valves, and monitoring safety alarms. Here, the cooling system of the FCs continue operating until the temperature returns to a target for the standby status. In particular, the idling system may use liquid instead of air cooling to rapidly cool components that overheated during the fault. In this way, the generator is at a safe temperature and protects the FCs during the fault status. The generator is also ready for a status transition rapidly out of the fault status.

Now turning to FIG. 1, one embodiment is illustrated of a generator 100 having FCs within which systems and methods disclosed herein may be implemented. As explained below, the generator 100 is controlled by an idling system 190 to cease and idle components associated with the generator, including the FC before entering a standby status. In one approach, ceasing involves operations powering down sensitive, non-critical, or other components of the generator 100. Idling may involve reducing the subcomponent energy, closing valves, and performing tests for a system to safely enter the standby status. In this way, the idling system 190 increases the durability and lifespan of the generator 100 by following the control sequence.

Moreover, the generator 100 includes an FC container 110 and a power electronics container 120. The FC container 110 houses the FCs 130 (e.g., 24 FCs) that are each electrically coupled to an electrical bus, thereby forming a power bank. Each electrical bus of the FCs is regulated by one of DC converters 140 that maintains and stabilizes a voltage level using a transistor circuit and power from multiple sources. Here, the DC converters 140 efficiently produce a DC voltage (e.g., 650 Volts DC (VDC)) consistently on each electrical bus from the varying DC power outputted by the FCs 130. As explained below, the electrical bus voltage may also vary due to a balance of plant (BOP) of the FCs 130 drawing power for operation. At the same time, the DC converters 140 regulate a same or different voltage level on electrical buses used by a load inverter 150 (e.g., a 1.5 megawatt (MW) inverter) or a generator inverter 160 (e.g., a 125 kilowatt (kW) inverter). For example, the DC converters 140 may deliver 1000 VDC to the load inverter 150 or the generator inverter 160 using a DC switchgear in the power electronics container 120. Related to voltage stability, the DC converters 140 prevent unusual voltage levels creating current that damages buses or wires of the generator 100.

Moreover, the DC switchgear controls and protects the DC converters 140, the load inverter 150, and the battery 170 during power delivery to a load. Power delivery from the FCs 130 is otherwise less reliable without the DC converters 140 due to irregularities associated with converting hydrogen to electricity. The irregularity can damage electrical buses, controllers, and other electronics of the generator 100.

Moreover, a load-center for the FC container operating at a certain voltage (e.g., 120 VAC) may receive commands from a container programmable logic controller (PLC). A load-center provides power, circuit control, and overcurrent protection to internal loads (e.g., fans or sensors) of the generator 100. As such, the load-centers in the generator 100 distribute power to various components operating at different voltage levels. Here, a load-center may power a BOP associated with the FCs 130 and other loads for the generator 100. Furthermore, the PLC commands may change power levels, operate the ignition, communicate with the load-center of the power electronics container 120, and the FC controllers. For example, the container PLC forms and sends a request for generating power to a gateway electronics control unit (ECU) during a generating status.

As explained below, the container PLC may operate with the idling system 190 to control components of the FC container 110 and the power electronics container 120 during status transitions. During the generating status, a gateway ECU uses ignition power (e.g., low-voltage 12

VDC) controlled by the container PLC and processes the request accordingly. This may also include coordinating with a PLC of the power electronics container during the generating status. In various implementations, the gateway ECU may be a component of the FC controllers and situated proximate to the container PLC. In one approach, ignition systems turn on electronics without the FCs 130. Subsequently, the FCs 130 generate power and energize the 650 VDC electrical bus according to signaling from the gateway ECU.

Regarding more details on the generating status, the FCs 130 use hydrogen ($H_2$) and oxygen in a reaction to generate power. Heating is controlled for the FC container 110 and a battery 170 (e.g., a 1000 volt pack) by the generator 100. In particular, coolant flows through the FC container 110 to each of the FCs 130 for maintaining safe temperatures during operation. Louvers for the heating, venting, and air conditioning (HVAC) system are also open for temperature control. Furthermore, the generator 100 monitors internal temperatures of the FC container 110 or a power electronics container 120 and controls fans (e.g., cooling or heating) accordingly. Safety alarms are triggered by the generator 100 if operating temperatures go beyond a target range, during a power surge, or a gas leak.

Concerning the power electronics container 120, the DC converters 140 may feed 1000 VDC on an electrical bus directly to a load (e.g., a building or device). The load inverter 150 on the other hand delivers AC power (e.g., 480 VAC) to the load. Furthermore, the generator 100 uses the generator inverter 160 to deliver power (e.g., 480 VAC) for the BoP of the FCs 130 or other components. A BoP has components used by the FCs 130 to convert fuel to electricity. For example, the components include pumps, sensors, heat exchangers, gaskets, compressors, recirculation blowers, and humidifiers used by the FCs 130. Accordingly, the generator inverter 160 can power the high-voltage load-centers of the FC container 110 and the power electronics container 120 using energy from the FCs 130. In one approach, an uninterrupted power supply (UPS) 180 uses utility power (e.g., 480 VAC) to power load-centers of the FC container 110 and the power electronics container 120. This operation may be helpful during startup or faults of the FCs 130.

Figure 2:
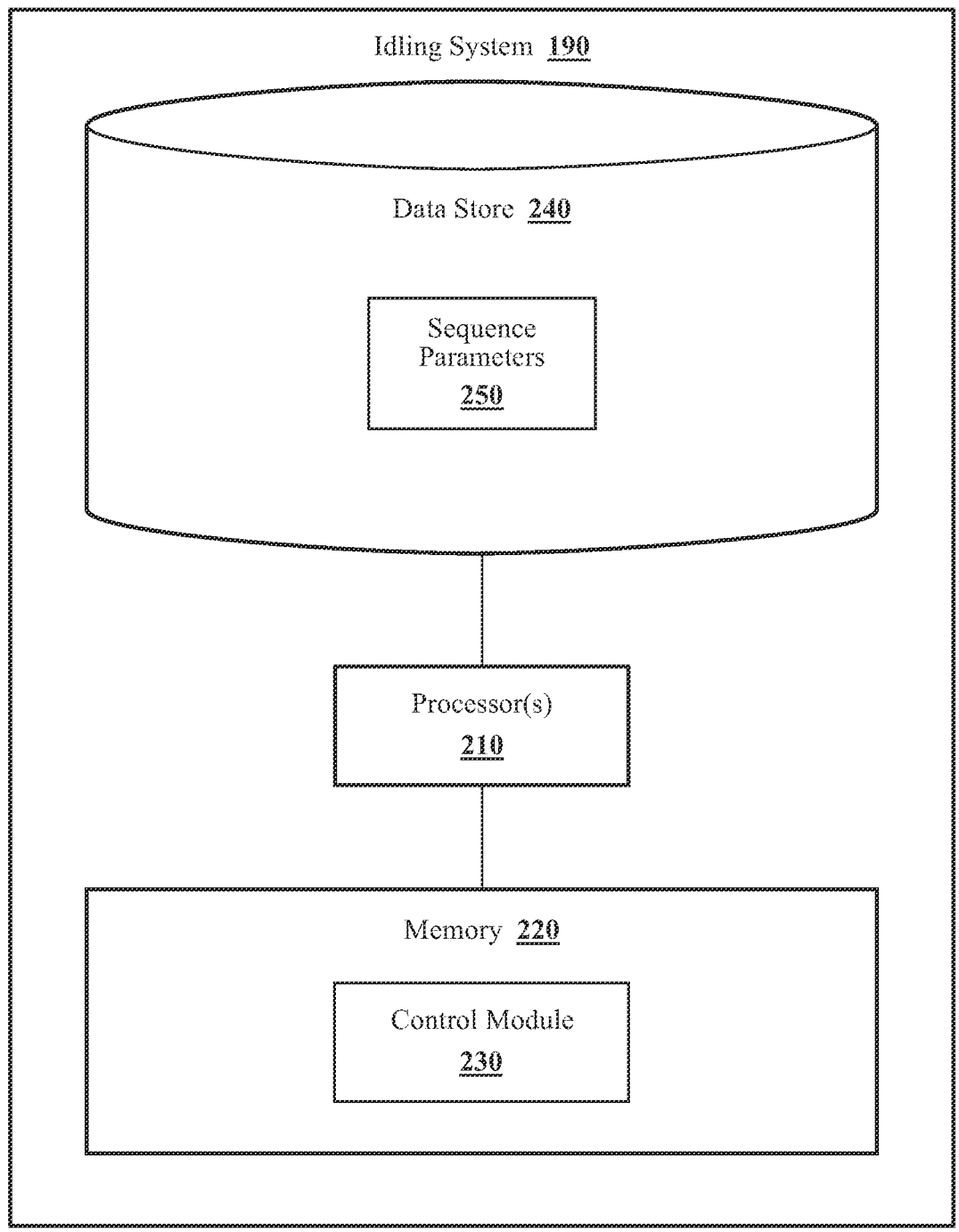
FIG. 2 illustrates one embodiment of an idling system that is associated with safely ceasing and idling a generator having FCs before entering standby.

With reference to FIG. 2, one embodiment of an idling system 190 of the generator 100 is illustrated. The idling system 190 is shown as including a processor(s) 210. In one embodiment, the idling system 190 includes a memory 220 that stores a control module 230. The memory 220 is a random-access memory (RAM), a read-only memory (ROM), a hard-disk drive, a flash memory, or other suitable memory for storing the control module 230. The control module 230 is, for example, computer-readable instructions that when executed by the processor(s) 210 cause the processor(s) 210 to perform the various functions disclosed herein.

The idling system 190 as illustrated in FIG. 2 is generally an abstracted form. With reference to FIG. 2, the control module 230 generally includes instructions that function to control the processor(s) 210 to cease or idle components of the generator 100 as explained in detail below. Moreover, in one embodiment, the idling system 190 includes a data store 240. In one embodiment, the data store 240 is a database. The database is, in one embodiment, an electronic data structure stored in the memory 220 or another data store and that is configured with routines that can be executed by the processor(s) 210 for analyzing stored data, providing stored data, organizing stored data, and so on. Thus, in one embodiment, the data store 240 stores data used by the control module 230 in executing various functions. Examples of data stores include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives.

Furthermore, the data store 240 includes the sequence parameters 250 for the generator 100. These sequence parameters 250 include commands, control signals, temperature ranges, electrical bus voltages, valve statuses, alarm types, fault codes, and so on associated with the idling system 190 ceasing or idling components for the generator 100. In particular, the control module 230 includes instructions that cause the processor(s) 210 to safely cease and idle the generator 100 having the FCs 130 as illustrated in FIG. 3.

Figure 3:
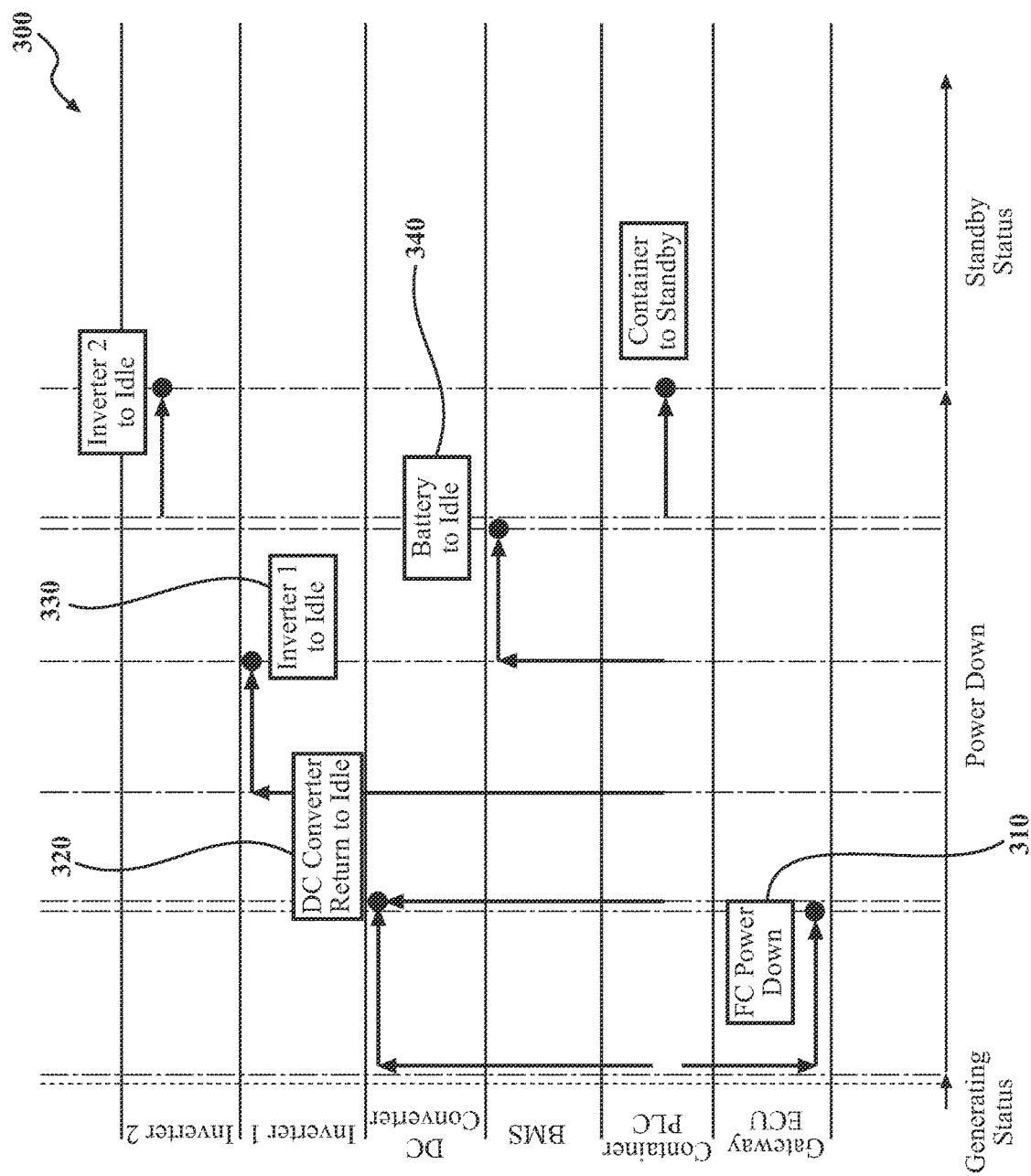
FIG. 3 illustrates a control sequence used by the idling system to safely cease the operation of the generator having FCs.

The sequence 300 in FIG. 3 involves the gateway ECU, the container PLC, a battery management system (BMS) transitioning components through generating, power-down, and standby statuses. The container PLC receives a command to disable power generation to a load (e.g., a residential or commercial building) during the generating status. This may be due to the load demand of a facility going offline, time-of-day, or another generator coming online. In response, the container PLC transitions to a power-down status and sends a stop command to the gateway ECU. Here, the FC container 110 maintains ignition power and supply power to the FCs 130 and other components for subsequent testing or operation abort. The idling system 190 may also use power for safety tasks such as blowing (i.e., reducing) remaining water from the FCs 130 associated with power generation.

Next, the idling system 190 completes FC powering down 310 for the FCs 130. This involves reducing the subcomponent power of the FCs 130 while maintaining energy for sensitive components. For example, the battery 170 still provides power to the high-voltage bus of the DC converters 140 for preventing a sudden drop-off to the inverters, sensitive electronics, or other subsystems. An abnormal transient response can also cause permanent damage or unsafe conditions for the generator 100. Furthermore, this step involves the gateway ECU of a FC(s) 130 acknowledging powering down to the container PLC for added verification.

Turning now to the DC converters 140, the container PLC sends a stop command to begin idling. This step may involve powering down controllers or de-energizing subcomponents of the DC converters 140 to prevent damage. The container PLC also sends an explicit command for the DC converters 140 to idle, thereby ensuring completion at 320. In a similar operation, the container PLC sends a stop command to begin idling the load inverter 150 and sends an explicit command to idle, thereby ensuring completion at 330.

The sequence 300 continues to tasks for the BMS. The container PLC sends a stop command to being idling the battery 170 via the BMS. Here, similar to the DC converters 140 the idling system carefully de-energizes battery cells to prevent damage. Furthermore, abnormal changes to the battery 170 can increase cycling time and charge retention. Step 340 also involves slowly reducing power to an electrical bus for the load inverter 150 or the generator inverter 160, thereby providing a steady and safe idle transition.

Next, the sequence 300 involves the FC container 110 powering down non-critical components and performing tests for sensitive components. As such, the idling system 190 powers down the ignition and the generator inverter

160. The idling system 190 also closes hydrogen and hydronic cooling valves. The bulk statuses are checked for abnormalities by the idling system 190 when closing the hydrogen and hydronic cooling valves for subsequent power generation. For temperature management, cooling valves are adjusted by the idling system 190 to prevent overheating of the FCs 130 or the DC converters 140. Here, liquid instead of air cooling allows the generator 100 to cool rapidly, thereby decreasing damage during a fault or status transition. For added temperature control, the idling system 190 runs the HVAC until reaching a target and subsequently powers down the HVAC. The target may be associated with the climate and location of the generator 100. In certain configurations, here load-centers of the generator 100 are transitioned to a utility feed or UPS.

Regarding the tests for sensitive components, the idling system 190 confirms that the high-voltage buses associated with the DC converters 140 are de-energized. The idling system 190 or the PLC container also checks for trouble codes for power electronics and the FCs 130. For more safety checks, the idling system 190 tests for gas or water leaks inside the FC container 110.

The generator 100 enters a standby status once the tests are completed successfully. In one approach, the standby status involves providing power to a controller of the power electronics container 120 and monitoring safety alarms. In this way, the controller is ready to receive a startup command from the container PLC for the next exit from the standby status. In addition, during the standby status, the gateway ECU receives low-voltage power without a signal to the ignition from the container PLC. This allows the gateway ECU less transition time to a generating status from standby. Regarding control values, the hydrogen valve is closed and waiting to supply fuel for the next exit from the standby status. The purge valve for the hydrogen and nitrogen valve are also closed since they are unnecessary to the FCs 130 during the standby status.

Moreover, the standby status may involve cooling at a low flow-rate by adjusting the request valve for standby. As such, the idling system 190 prevents freezing of the FCs 130 in certain climates. The idling system 190 also maintains targets for temperatures for the FCs 130 by adjusting supply/bypass valves. Similarly, the HVAC monitors temperatures internal to the FC container 110 and adjusts fans or heaters accordingly.

On the other hand, the generator 100 enters a fault status if the tests are unsuccessful. The fault status involves the idling system 190 commanding the gateway ECU of the FC(s) 130 to power down, closing the hydrogen valve once components are stable, and monitoring safety alarms. Here, the cooling system of the FC container 110 continues operating until the temperature returns to a target for the standby status. In particular, the idling system 190 may use liquid instead of air cooling to rapidly cool components that overheated before a fault. The HVAC also continues operating until the ambient temperature of the FC container 110 returns to a standby target. In this way, the generator 100 is at a stable temperature during the fault status. Furthermore, the ignition signal to the gateway ECU is maintained by the idling system for readiness to the next status transition. In addition, the container PLC may send a malfunction signal to the gateway ECU of the FC(s) 130 for powering down when the fault is associated with the FC container 110 or the power electronics container 120. The container PLC also communicates fault information to a human-machine interface (HMI) or BMS component for further diagnosis.

During the fault status, the idling system 190 continues sending an ON request to the BMS for cooling. In this way, the battery 170 stays cool while providing power to components and electrical buses in the generator 100. The idling system 190 also maintains coolant flow through the FC container 110 until reaching a temperature for standby. The idling system 190 subsequently sends a standby request to the BMS for readiness to the next status transition. In this status, the HVAC closes louvers and uses fans to reduce temperature internal to the FCs 130 until reaching a standby temperature. Furthermore, the HVAC operates to condensate moisture within the FCs 130 until reaching a target humidity level. In this way, the HVAC prevents fires and water damages associated with a fault.

Once the generator 100 is in the standby status without a fault, the idling system 190 idles the generator inverter 160. In addition, the container PLC disables the ignition system upon completion of idling the load inverter 150, the DC converters 140, and the battery 170. In this way, the generator 100 is ready to generate or enter another state upon request.

Figure 4:
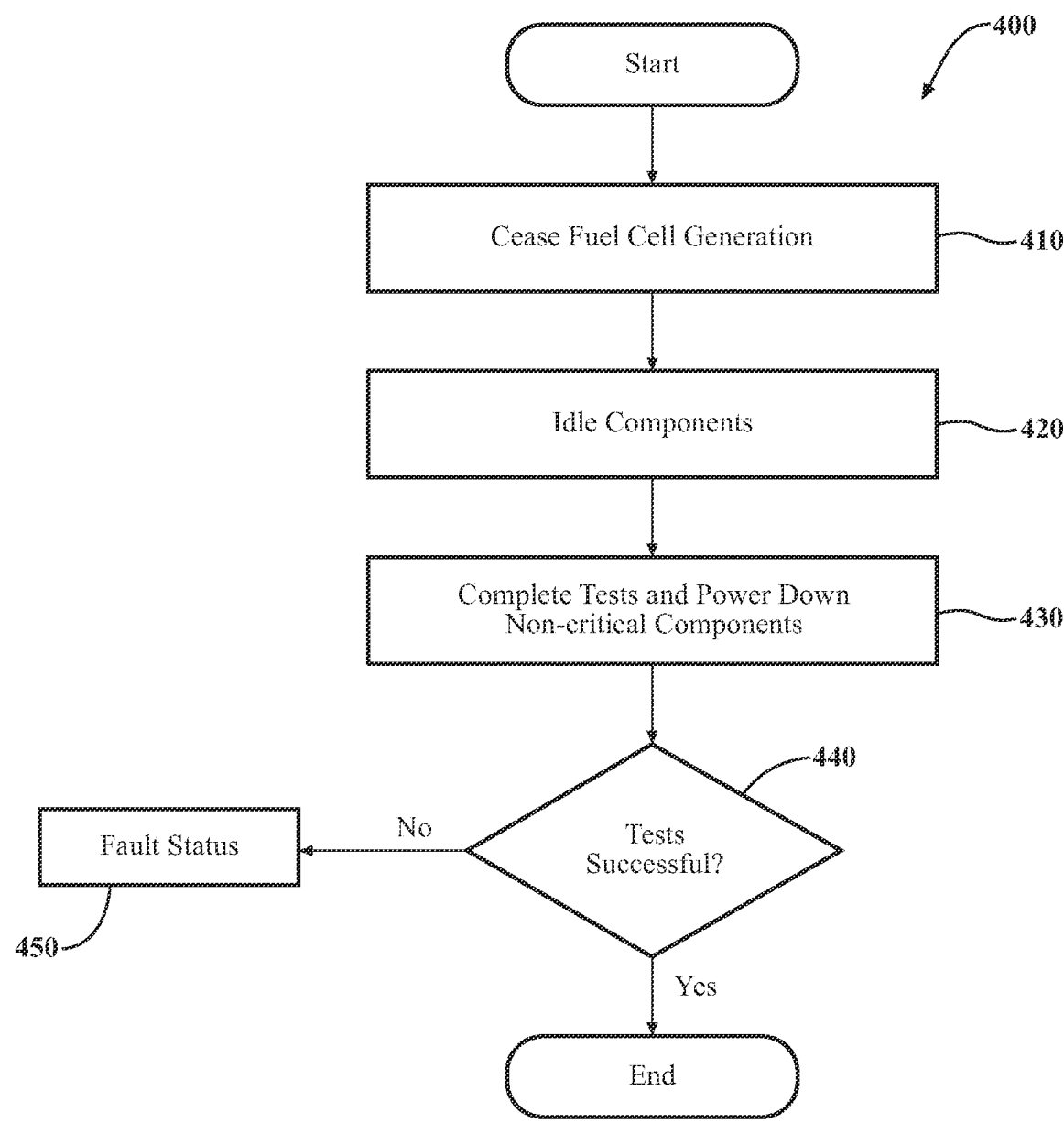
FIG. 4 illustrates one embodiment of a method that is associated with ceasing, idling, and testing a generator having FCs.

Additional aspects of the idling system 190 will be discussed in relation to FIG. 4. FIG. 4 illustrates a flowchart of a method 400 that is associated with ceasing, idling, and testing the generator 100 having the FCs 130 to increase reliable operation. Method 400 will be discussed from the perspective of the idling system 190 of FIG. 2. It should be appreciated that the method 400 is not limited to being implemented within the idling system 190 but is instead one example of a system that may implement the method 400. In particular, the idling system 190 controls the generator 100 to cease or idle components associated with the FCs 130 and the generator 100 using a control sequence before entering a standby status. By following the control sequence, the idling system 190 increases durability, safety, and lifespan of the generator 100.

At 410, the idling system 190 ceases power generation by the FCs 130 while maintaining energy to sensitive components. In particular, the idling system 190 gradually reduces power to the FCs 130 by powering down electrical buses using the DC converters 140. The generator 100 uses this regulated approach and maintains energy levels since the FCs 130 consume electricity and output excess energy before completely powering down. For example, a BoP(s) of the FCs may draw power from an electrical bus to properly shut down water pumps, gas pumps, heat exchangers, compressors, or blowers. During 410, the idling system 190 also preconditions the generator 100 for future generation by blowing or clearing water from the FCs 130 before completely powering down. In this way, the idling system 190 prevents damage to the FCs 130 from moisture.

At 420, the idling system 190 idles components such as the DC converters 140 and the load inverter 150 before the battery 170. Here, the idling system 190 reduces the electrical bus energy of the FCs 130 to low-voltage before completely idling the load inverter using the battery 170. In this way, a target load still gradually receives power from the battery 170, thereby preventing a sudden drop. The FCs 130 also have power to perform remaining tasks before completely powering down. For example, the generator 100 flushes or blows out water from the FCs 130 using power from the battery 170. Also, the idling system 190 gradually reduces energy for electrical buses coupled to the DC converters 140. The battery 170 finally disconnects to disable high-voltage energy to the DC converters 140.

At 430, the idling system 190 completes tests and power downs non-critical components before entering the generator 100 to a standby status. In one approach, the tests are initiated and conducted before, during, or after the idling of the inverter and the battery. As such, the idling system 190 powers down the ignition and the generator inverter 160. The idling system 190 also closes hydrogen and hydronic cooling valves. Also, during this power down, cooling valves are adjusted by the idling system 190 to prevent overheating of the FCs 130 or the DC converters 140. Here, liquid instead of air cooling allows the generator 100 to cool rapidly, thereby decreasing damage during a status transition. For temperature management, the idling system 190 runs the HVAC until reaching a target and subsequently powers down the HVAC. The target may be associated with the climate and location of the generator 100.

Regarding testing, the idling system 190 checks states of sensitive components. For example, the idling system 190 checks for complete power down of the FCs 130. Another test is for leaks such as hydrogen fuel. The idling system 190 may also check for abnormal voltage levels on the high-voltage bus in the FC container 110. In one approach, faults from testing of non-critical components by the idling system 190 may be logged while operations continue.

At 440, the idling system 190 determines if a test is successful. For example, a successful test involves all of the FCs 130 reporting appropriate energy levels, temperatures, and water levels. Another test may be that a sensor of the FC container 110 does not indicate a leak. The FCs 130 or the generator 100 enter a fault status if a test is unsuccessful or timeouts. Otherwise, the transition to the standby status is completed.

As such, at 450 the idling system 190 enters the FCs 130 or the generator 100 to a fault status when a test is unsuccessful. In one approach, the fault status involves the idling system 190 commanding the gateway ECU of a FC(s) 130 to power down, closing the fuel valve once components are stable, and monitoring safety alarms. Here, the cooling system of the FC container 110 continues operating until returning to a target temperature for the standby status. In one approach, the idling system 190 uses liquid instead of air cooling to rapidly cool components that overheated during the fault. The HVAC also continues operating until the FC container 110 returns to a standby target. In this way, the generator 100 is at a safe temperature during the fault status and ready for the next status transition. In addition, the container PLC may send a malfunction signal to a gateway ECU for powering down the FC(s) 130 when the fault is associated with the FC container 110 or the power electronics container 120. In this way, damage to the FC(s) 130 is mitigated by the idling system 190.

As added protection, the BMS keeps the battery 170 operating for cooling while providing power to the components and electrical buses in the generator 100. This may also precondition the generator for the next status transition. The idling system 190 also maintains coolant flow through the FC container 110 until reaching a standby temperature to prevent overheating.

Moreover, the HVAC closes louvers, uses fans to reduce temperature internal to the FCs 130 until reaching the standby temperature during a fault. For humidity control, the HVAC operates to condensate moisture within the FCs 130 until reaching a target moisture level. In this way, the HVAC prevents fires and water damage associated with a fault.

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an application-specific integrated circuit (ASIC), a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., an ASIC), an analog circuit, a digital circuit, a programmed logic device, a memory device including instructions that, when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An idling system, comprising:
   one or more processors; and
   a memory communicably coupled to the one or more processors and storing:
   a control module including instructions that, when executed by the one or more processors, cause the one or more processors to:
      cease power generation by reducing fuel to a fuel cell (FC) within a generator while maintaining energy to sensitive components by a battery;
      idle a direct current (DC) converter and a load inverter associated with the power generation before idling the battery; and
      upon successfully completing tests and powering down non-critical components of the generator, enter the generator into a standby status.

2. The idling system of claim 1, further including instructions to enter the FC and the generator into a fault status that closes hydrogen supply and maintains cooling operations to the FC when results of the tests are unsuccessful, wherein the DC converter and the load inverter remain engaged during the fault status.

3. The idling system of claim 1, wherein the instructions to cease the power generation further include instructions to sustain a first power level for a bus that powers the FC before idling the DC converter to clear water associated with the power generation by the FC.

4. The idling system of claim 3, further including instructions to reduce, by the DC converter, the first power level on the bus to a second power level using the battery before idling the load inverter.

5. The idling system of claim 1, further including instructions to disable an ignition system and a generator inverter after idling the load inverter, the DC converter, and the battery.

6. The idling system of claim 1, wherein the sensitive components include one of a power system that energizes the FC and a bus of the FC and the non-critical components include a temperature management system, a control valve for cooling liquids, and a supply valve for hydrogen.

7. The idling system of claim 1, further including instructions to conduct a safety test for the non-critical components associated with idling the load inverter and the battery.

8. The idling system of claim 1, wherein idling the DC converter, the load inverter, and the battery represents powering down the FC completely.

9. A non-transitory computer-readable medium comprising:
instructions that when executed by a processor cause the processor to:
cease power generation by reducing fuel to a fuel cell (FC) within a generator while maintaining energy to sensitive components by a battery;
idle a direct current (DC) converter and a load inverter associated with the power generation before idling the battery; and
upon successfully completing tests and powering down non-critical components of the generator, enter the generator into a standby status.

10. The non-transitory computer-readable medium of claim 9, further including instructions to enter the FC and the generator into a fault status that closes hydrogen supply and maintains cooling operations to the FC when results of the tests are unsuccessful, wherein the DC converter and the load inverter remain engaged during the fault status.

11. The non-transitory computer-readable medium of claim 9, wherein the instructions to cease the power generation further include instructions to sustain a first power level for a bus that powers the FC before idling the DC converter to clear water associated with the power generation by the FC.

12. The non-transitory computer-readable medium of claim 11, further including instructions to reduce, by the DC converter, the first power level on the bus to a second power level using the battery before idling the load inverter.

13. A method comprising:
ceasing power generation by reducing fuel to a fuel cell (FC) within a generator while maintaining energy to sensitive components by a battery;
idling a direct current (DC) converter and a load inverter associated with the power generation before idling the battery; and
upon successfully completing tests and powering down non-critical components of the generator, entering the generator into a standby status.

14. The method of claim 13, further comprising:
entering the FC and the generator into a fault status that closes hydrogen supply and maintains cooling operations to the FC when results of the tests are unsuccessful, wherein the DC converter and the load inverter remain engaged during the fault status.

15. The method of claim 13, wherein ceasing the power generation further includes sustaining a first power level for a bus that powers the FC before idling the DC converter to clear water associated with the power generation by the FC.

16. The method of claim 15, further comprising:
reducing, by the DC converter, the first power level on the bus to a second power level using the battery before idling the load inverter.

17. The method of claim 13, further comprising:
disabling an ignition system and a generator inverter after idling the load inverter, the DC converter, and the battery.

18. The method of claim 13, wherein the sensitive components include one of a power system that energizes the FC and a bus of the FC and the non-critical components include a temperature management system, a control valve for cooling liquids, and a supply valve for hydrogen.

19. The method of claim 13, further comprising:
conducting a safety test for the non-critical components associated with idling the load inverter and the battery.

20. The method of claim 13, wherein idling the DC converter, the load inverter, and the battery represents powering down the FC completely.

* * * * *